United States Patent [19]
Ellertson et al.

[11] Patent Number: 6,138,069
[45] Date of Patent: Oct. 24, 2000

[54] UTILITY VEHICLE WITH WORK-PERFORMING ATTACHMENT

[75] Inventors: Gary A. Ellertson, Kenosha; Mark W. Fischer, Racine, both of Wis.

[73] Assignee: Textron Inc., Providence, R.I.

[21] Appl. No.: 09/318,068

[22] Filed: May 24, 1999

[51] Int. Cl.$^7$ .............................. B60K 41/20; A01B 61/00
[52] U.S. Cl. ..................................... 701/50; 701/65; 74/11
[58] Field of Search .................................. 701/50, 70, 93, 701/90, 91, 53, 65; 180/170, 16; 74/11, 15.4

[56] References Cited

U.S. PATENT DOCUMENTS

| 4,582,141 | 4/1986 | Van Der Lely | 172/3 |
| 4,663,713 | 5/1987 | Cornell et al. | 701/51 |
| 5,074,373 | 12/1991 | Schmidt | 180/305 |
| 5,417,193 | 5/1995 | Fillman | 123/352 |
| 5,649,606 | 7/1997 | Bebernes et al. | 180/307 |

*Primary Examiner*—Tan Nguyen
*Attorney, Agent, or Firm*—Arthur J. Hansmann

[57] ABSTRACT

A hydraulically driven utility vehicle which supports and powers work attachments. An electronic system is incorporated in the vehicle for having the vehicle traverse the ground at a selected speed and for operating the attachment at a selected speed so that the work of the attachment can be performed in a uniform rate, as desired.

4 Claims, 1 Drawing Sheet

UTILITY VEHICLE WITH WORK-PERFORMING ATTACHMENT

This invention relates to a utility vehicle with a work-performing attachment, and, more specifically, it applies to a utility vehicle which is hydraulically and electronically powered.

BACKGROUND OF THE INVENTION

The prior art is aware of utility vehicles, such as tractors and trucks which support, power and transport attachments or implements, such as those disclosed in the patents cited herein. These vehicles can traverse the ground while the attachment is performing its work, such as in the present instance of the application of turf fertilizer, top dressing, pesticides, grass mowing, or the like. These vehicles are engine powered and hydraulically driven, and they also include electric controls, and one arrangement of such is disclosed in U.S. Pat. No. 5,074,373 which, to the extent of its disclosure, it may be considered as being incorporated herein.

The present invention is concerned with an engine-driven vehicle which includes a hydraulic system for mobilizing the vehicle and which also includes hydraulics for powering attachments supported by the vehicle. Further, electronic controls are included, and they influence the engine and the power-take-off control for the attachment such that the attachment can be operated at a constant speed while the vehicle traverses the ground at a constant speed, all so the work performance of the attachment is desirably consistent relative to the speed of traversing the ground.

That is, for uniformity of the work performance of the attachment as the vehicle traverses the ground, the vehicle ground speed is at a constant rate so that the attachment properly performs its function at a desired operational speed, such as for in application of fertilizer, top dressing, spraying, mowing and the like.

Two other U.S. patents in the area of engine speed control and/or hydraulic systems are U.S. Pat. Nos. 5,417,193 and 5,649,606, both of which are incorporated herein by this reference thereto.

The invention utililizes electronics and hydraulics for precise control of mowing and the application of fertilizer, top dressing, pesticides, and any other product requiring precise application, including constant ground speed of the vehicle. This allows the vehicle to be set up for a particular job, and, with a computer in the vehicle, it gives the operator full records of application rates and vehicle operational settings. By full closed loop control the chance of misapplication is minimized, and also wasted material is minimized. Operator abuse is also minimized, and the acceleration rates can be programmed for forward and reverse movement, and the maximum speeds can be programmed for ground speed and engine speed.

DETAILED DESCRIPTION OF THE PREFERRED EMBODIMENT

Figure 1:
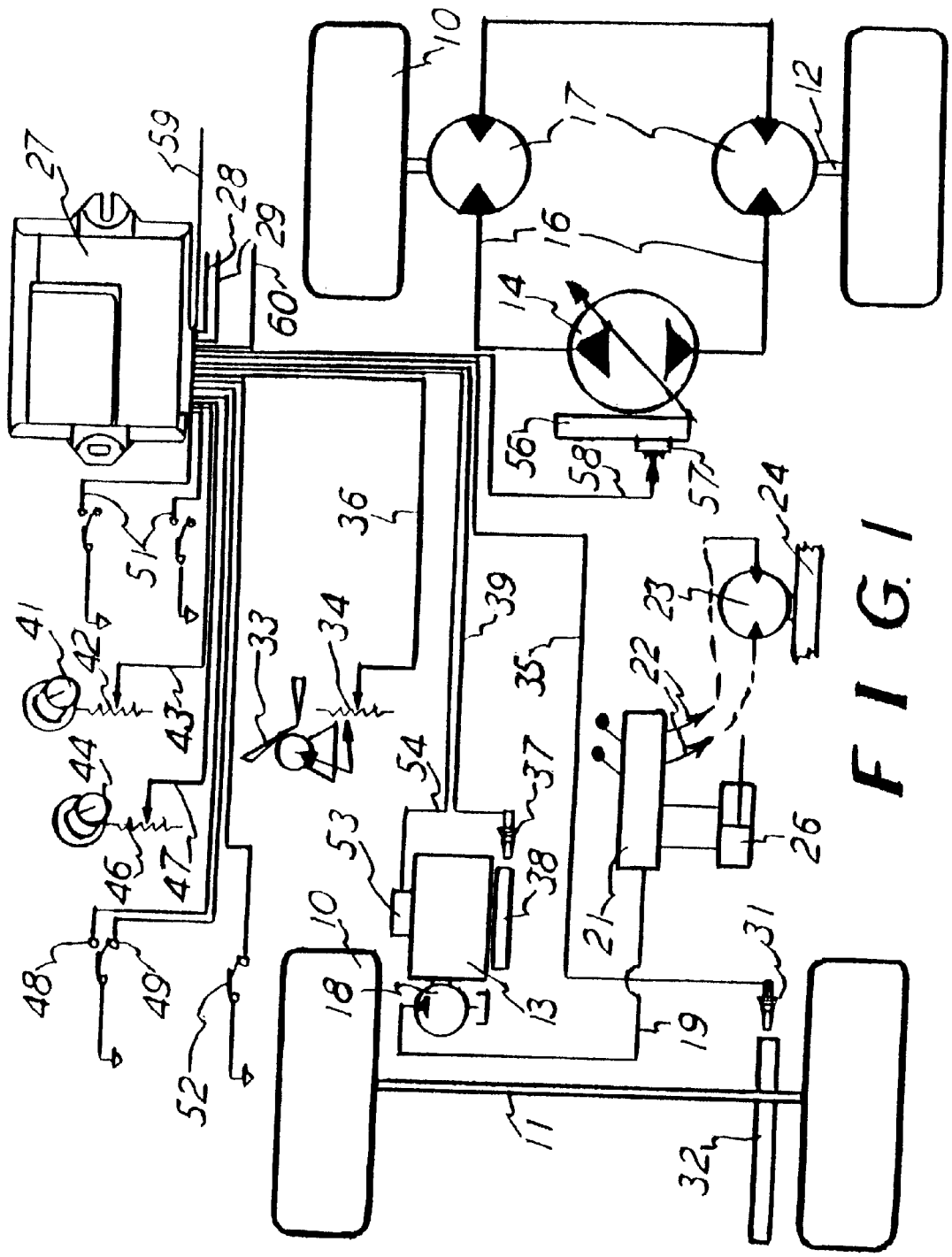
FIG. 1 is a diagrammatic view of a vehicle having hydraulic and electronic components and an attachment on it.

Except where specifically diagrammed, the disclosure herein is of a conventional utility vehicle which supports and transports an attachment for performing work as the vehicle traverses the ground. As such, the diagram shows four vehicle wheels designated 10 and axles 11 and 12 which rotatably support the wheels in the usual arrangement. Also, a conventional engine 13 is mounted on the vehicle and it is suitably arranged with suitable connections for purposes of propelling the vehicle over the ground as well as powering the attachments selectively mounted on the vehicle, all in any conventional arrangement.

Thus, there is a hydraulic pump 14 powered by the engine 13 and connected through lines 16 to wheel motors 17 which in turn rotatably drive the two wheels 10, as shown. Thus, the vehicle is hydraulically driven for moving over the ground.

The engine 13 is also suitably drivingly connected to a hydraulic pump 18 which, through a hydraulic line 19, connects to an operator controlled valve 21 which in turn is connected by hydraulic lines 22 to an attachment-driving motor 23, for instance. As such, the motor 23 is drivingly connected to an attachment fragmentarily shown at 24, and the arrangement is of any conventional manner wherein there is a hydraulic system, as indicated, powered by an engine and drivingly related to a work-performing attachment such as the indicated attachment 24 which may be an attachment for any one of the heretofore mentioned functions. Thus, the connection between the driving device, such as the motor 23, and the attachment 24 is of a coupling arrangement where various types of attachments can be selectively mounted and supported on the vehicle, again, in a conventional arrangement, except as otherwise disclosed herein. A dump box cylinder 26 is also shown connected in the hydraulic system.

The heretofore mentioned hydraulic system and connection for driving an attachment is arranged such that the speed of the engine 13 is directly imposed upon the speed of operation of the attachment 24. That is, the speed of the attachment 24 is controlled and directly related to the speed of the engine 13, and that is shown by the indicated direct drive of the hydraulic pump 18 off the engine 13.

Beyond the hydraulic system for both the vehicle transport and the attachment drive, as disclosed, there is an electronic system for establishing and controlling the speed of the engine 13 and also the speed of the vehicle in traversing the ground. In that electronic system, as shown, there is an electronic controller 27 which is herein described and disclosed as the "Susmic 10", manufactured by Sauer Sundstrand Corporation, 3900 Annapolis Lane, Minneapolis, Minn. 55447. The controller 27 has conventional power and ground electric lines 28 and 29 connected therewith so that it is conventionally electrically powered, such as battery and generator power supplied to the electric system shown.

Also, there is an electric ground speed sensor 31 which is effective on an interconnection 32 with, for instance, the axle 11 for detecting the ground speed of the vehicle and producing a first one of five electric output signals, and this one is impressed through the line 32 to the controller 27. An operator's conventional foot pedal 33 is on the vehicle and has an electric controller or potentiometer 34 connected therewith, and, as such, it produces a second of the five electric output signals. The potentiometer 34 is connected through the line 36 to the controller 27. Another speed sensor 37 is adjacent the engine 13 and operates on the engine connection 38 to detect engine speed, and it is electrically connected to the controller 27 through the electric line 39 and produces the third of the five electric output signals.

A manually operative ground speed control 41 is movably mounted on the vehicle and has a potentiometer 42 electrically connected to the controller 27 through the electric line 43 and it produces the fourth of the five electric output signals imposed on the controller 27. A manually operative engine speed control 44 is movably mounted on the vehicle and has a potentiometer 46 which produces the fifth one of the five electric output signals, and it is connected to the controller 27 through the electric line 47.

With the aforementioned, the five electric output signals are imposed on the controller 27, all respectively in accord with ground speed, foot pedal position, engine speed, and the respective manual settings of the control knobs 41 and 44.

There is a also a vehicle cruise switch connection point 48 and there is also a manual switch connection point 49 such that the connections 48 and 49 are made in the alternative for cruise and manual setting of the entire electronic system shown and described. Of course the contact points 48 and 49 are suitably connected with the controller 27 by the shown lines extending therebetween. Also, there are generally designated connections 51 with the controller 27 and these can be used for electric calibration of the controller 27. Still further, there is a work mode switch 52 which is connected with the controller 27 for placing the system in the work mode.

The engine 13 has an electronically controlled carburetor or the like fuel feeder 53, which, through the electric line 54, is connected with the controller 27. The arrangement is such that controlling electricity to the electric controlled carburetor 53 will properly feed the fuel to the engine 13 for the desired engine speed.

An electronic controller 56 is suitably and conventionally attached to the vehicle wheel drive pump 14, and there is an electric sensor 57 on the controller 56, and the electric line 58 connects the controller 56 with the electronic controller 27, as indicated.

The foot pedal 33 is arranged to provide for forward, neutral, and reverse positioning of the pedal and thus the corresponding drive for the driving pump 14 through a conventional pump drive from the engine.

The system functions by having the operator first select a mode of operation with the switches 48 and 49 and with another direction of travel switch having an electric connection 59 with the controller 27. The engine and hydraulics remain at rest until the operator inputs a signal to the controller 27 by pressing on the foot pedal 33. When the input from the pedal 33 is received at the controller 27, the controller 27 sends out a signal to the carburetor 53 and the hydraulic pump 14, then the vehicle starts to move. The controller 27 will change the output signals to the carburetor 53 and to the pump 14 until the input from the speed sensors 31 and 37 match the input from the foot pedal 33. The system is then stable.

In a governor mode, the engine speed can be set up to a maximum speed, and there is then engine speed control through the foot pedal and up to that maximum speed. This mode can be used under conditions requiring slower vehicle speed such as turning maneuvers.

In a throttle mode, the minimum engine speed can be set, and that speed is controllable through the pedal 33 to actually produce a speed faster than the set speed, and that mode can be used where it may be desirable to make a turn at a faster speed than the set rate.

In this description, there are the five so-called output signals fed into the controller 27 which in turn electrically controls the carburetor 53 and the vehicle drive pump 14, as mentioned. Of course the power-take-off system with its pump 18 and take-off motor 23 are operated at speeds consistent with the speed of the engine 13. That results in the attachment 24 being operated at a uniform speed, and also the travelling of the vehicle itself can be at a uniform speed, all as desired for the work being performed by the then mounted and connected attachment, such as the attachment 24.

In this description, the method invention is also inherently described herein. Also, it will be noticed that there is an electric line designated 60 which is used for the calibration and diagnosis of the electric controller 27, in the usual manner.

What is claimed is:

1. In a utility vehicle of the type having an engine, a hydraulic drive ground-traversing system with ground wheels drivenly connected with the engine, and a hydraulic power take-off system drivenly connected with the engine and having an attachment for driving the attachment from the engine to perform work relative to the ground traversed by the vehicle, the improvement comprising generating five electric output signals and constant vehicle ground speed by virtue of:

an electric sensor operative in relationship to the speed of said wheels and being operative for the emission of a first electric output signal in accord with the speed of said wheels, the power-take-off system being operable at speeds synchronized with the speeds of said engine and being operatively driven by said engine at speeds synchronized with the speeds of said engine and being drivingly connected with said attachment for the operation of said attachment at selected speeds, an electrically responsive hydraulic pump and a hydraulic motor operatively mounted on the vehicle and drivingly connected together and being operatively connected with said engine and said wheels for powering said wheels at selectable constant ground speeds, an engine speed selectably movable foot pedal on the vehicle and having a selectively variable electric current controller operative according to the selected moved position of said pedal for the emission of a second electric output signal, an engine speed electric sensor operative in response to the speed of said engine for detecting engine speed and being operative for the emission of a third electric output signal, in accord with the speed of said engine, an engine fuel feeder connected with said engine for supplying fuel to said engine and including an electric device electrically connected to said engine speed sensor for metering the supply of fuel to said engine in accord with reception of the output signal from said engine speed electric sensor, a manually adjustable vehicle ground-speed control having a selectively variable electric controller for establishing the amount of electric current flowing therethrough for the emission of a fourth electric output signal in accord with the electric current flowing therethrough, a manually adjustable vehicle engine-speed control having a selectively variable electric controller for establishing the amount of electric current flowing therethrough for the emission of a fifth electric output signal, in accord with the electric current flowing therethrough, an electrically powered electronic controller of the type capable of processing the electricity of the input of the five signals and sending current therefrom in accord with said signals, discrete electric connections respectively connected between said electronic controller and each of said ground-speed sensor, and said foot pedal controller, and said engine-speed sensor, and said manual ground-speed controller, and said manual engine-speed controller, all for imposing the respective said output signals one through five onto said electronic controller, and electric connections respectively connected between said electronic controller and said engine fuel feeder electric device for sending electric signals to said electric device in electric power sufficient to control the operating speed of said engine, to thereby establish and maintain a selected speed of operation of said attachment and of the ground speed of the vehicle.

2. The utility vehicle as claimed in claim 1, wherein said electronic controller and said foot pedal controller and the latter are electrically connected with both said engine speed sensor and said ground speed sensor, and with an operative arrangement for electrically signaling between the herein stated said controllers and said sensors and thereby detect slowing in the speed of said engine in response to and an increase of load and thereby automatically adjust the operation of said engine to thereby avoid the stalling of said engine.

3. The utility vehicle as claimed in claim 1, including said foot pedal electric current controller is electrically connected in said electronic controller whereby a minimum engine speed can be established by actuation of said foot pedal, said manually adjustable vehicle ground-speed controller is electrically connected in said electronic controller for sensing said minimum engine speed and has an electric connection with said engine electric current controller for providing an engine speed no less than said minimum engine speed and doing so independent of further actuation of said foot pedal, and said foot pedal electric current controller being electrically operative and connected in said electronic controller for increasing said minimum engine speed upon actuation of said foot pedal.

4. In a method for operating a utility vehicle having an engine and ground wheels and a hydraulic drive ground-traversing system and a power-take-off for driving attachments which perform work relative to the ground traversed by the vehicle, the improvement comprising the steps of generating five electric output signals and constant vehicle ground speed by virtue of:

providing two separate hydraulic drivers, with electric controllers thereon, for operationally driving the respective said attachment and said wheels, and interconnecting said drivers with said engine to be separately driven thereby at respective selected speeds, electrically monitoring the respective speed of said ground wheels and said engine, electrically processing the results of the respective speed monitoring, establishing said speeds of both said drivers to be at a respective constant speed by respectively directing the processed electrical power to said controllers, and electrically adjusting the electric power to said controllers according to the respective speed monitoring and doing so to an amount to maintain the respective said constant speeds.

* * * * *